C. T. Fairchild,
Saw-Mill Head-Block.
Nº 43,365.   Patented June 28, 1864.
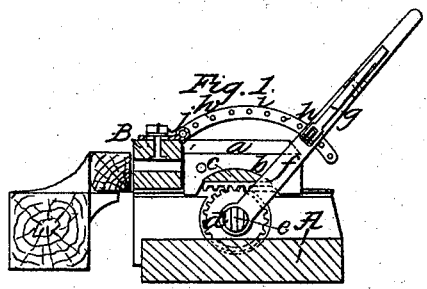
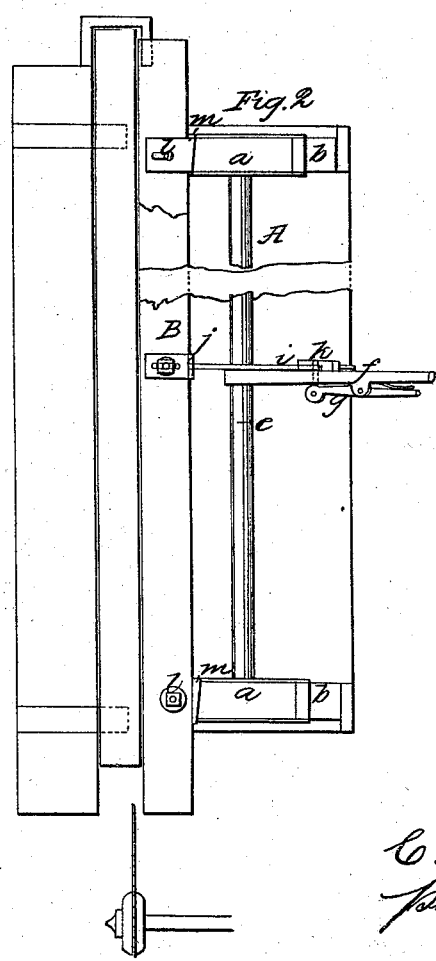

UNITED STATES PATENT OFFICE.

C. T. FAIRCHILD, OF SALISBURY, NEW YORK, ASSIGNOR TO WILLIAM A. VEER, OF SAME PLACE.

IMPROVEMENT IN SAW-MILLS.

Specification forming part of Letters Patent No. 43,365, dated June 28, 1864.

*To all whom it may concern:*

Be it known that I, C. T. FAIRCHILD, of Salisbury, in the county of Herkimer and State of New York, have invented a new and Improved Saw-Gage; and I do hereby declare that the following is a full, clear, and exact description of the same, reference being had to the accompanying drawings, making a part of this specification, in which—

Figure 1 represents a transverse vertical section of my invention. Fig. 2 is a plan or top view of the same.

Similar letters of reference indicate like parts.

This invention relates to certain improvements in gages for circular and other saws, whereby, after each cut, the log can be readily moved the desired distance for another cut and the thickness of the boards can be determined without loss of time.

The nature of my invention and its peculiar advantages will be readily understood from the following description.

A represents the platform or frame to which the gage B is attached. This frame is secured to the saw-table and the carriage supporting the log extends in front of and at a convenient distance from the same. The gage B consists of a long rail equal in length to the log, so that the board to be cut is supported from one end to the other and a springing of the same during the operation of sawing is prevented. The rail B is secured to two arms, $a$, which move on guideways $b$, rising from the ends of the platform A, and said arms are provided at their lower surfaces with toothed racks $c$, (see Fig. 1,) which gear in pinions $d$, attached to the ends of an arbor, $e$. This arbor has its bearings in the sides of the guideways $b$, and it extends from one end of the platform A to the other, as clearly shown in Fig. 2. It is operated by means of a hand-lever, $f$, which is firmly secured to the same at about the center of its length, and the position of the hand-lever and of the arbor is determined by means of a spring-catch, $g$, catching in one of the holes $h$ in the segmental arm or index $i$. This index is hinged to the inner edge of the rail B, and the hinge $j$, which retains it, is slotted, so that the same together with the index, can be adjusted backward or forward, according to the thickness of the boards to be sawed. A forked bracket, $k$, secured to the side of the hand-lever $f$, forms the guide for the index $i$, and the holes in said index are arranged at such distances apart that each hole corresponds to half an inch motion of the gage; but it is obvious that more or less holes can be made in each index, or that said holes can be arranged at any convenient distance apart. The rail B itself is secured to the guide arms $a$ by means of screw-bolts $l$, which pass through slots in said rail, and wedges $m$, driven in between the arms $a$ and rail B, serve to bring either end of the latter forward, so that the gage can be easily adjusted to the rake of the saw. The rail or gage B is slotted throughout its whole length to push up the follower and force out the last board to be cut from the log. By this arrangement the gage supports the board to be cut from end to end, the log is placed on the carriage, and it is squared by cutting off slabs from at least three sides. The carriage is gigged back and the gage is set to the desired thickness by means of the hand-lever, and the first board is cut off; then the saw is gigged back, the log is moved up to the gage, and the second cut is accomplished, and so on until the entire log is cut up, with little loss of time, in boards of a uniform thickness throughout.

What I claim as new, and desire to secure by Letters Patent, is—

1. The rail B, bearing on the log from end to end, in combination with the arms $a$, toothed racks $c$, pinions $d$, arbors $e$, and hand-lever $f$, constructed and operating substantially as and for the purpose specified.

2. The index $i$, adjustable by means of the slotted hinge $j$, in combination with the hand-lever $f$, spring-catch $g$, and gage B, constructed and operating substantially in the manner and for the purpose specified.

C. T. FAIRCHILD.

Witnesses:
 WYLLYS AVERY,
 JAMES H. IVES.